United States Patent [19]
Bird et al.

[11] Patent Number: 5,905,904
[45] Date of Patent: May 18, 1999

[54] PARALLEL DATA PROCESSING SYSTEM AND METHOD OF CONTROLLING SUCH A SYSTEM

[75] Inventors: Colin Leonard Bird, Eastleigh; Graham Derek Wallis, Locks Heath, both of United Kingdom

[73] Assignee: International Business Machines Corporation, Armonk, N.Y.

[21] Appl. No.: 08/906,685

[22] Filed: Aug. 5, 1997

[30] Foreign Application Priority Data

Jan. 4, 1997 [GB] United Kingdom .................. 9706549

[51] Int. Cl.$^6$ ...................................................... G06F 15/00
[52] U.S. Cl. ................ 395/800.31; 395/200.31; 395/200.38; 395/800.28
[58] Field of Search ................ 395/800.31, 800.28, 395/200.31, 200.6, 200.8, 200.32, 200.38, 200.5

[56] References Cited

U.S. PATENT DOCUMENTS

| | | | |
|---|---|---|---|
| 4,654,654 | 3/1987 | Butler et al. | 340/825.5 |
| 4,882,674 | 11/1989 | Quint et al. | 364/200 |
| 4,970,658 | 11/1990 | Durbin et al. | 706/60 |

FOREIGN PATENT DOCUMENTS

| | | |
|---|---|---|
| 1 496 779 | 1/1978 | United Kingdom . |
| WO 94/01818 | 1/1994 | WIPO . |

OTHER PUBLICATIONS

Birrell, et al., "Implementing Remote Procedure Calls", ACM Transactions on Computer Systems, vol. 2, No. 1, Feb. 1984, pp. 39–59.

*Primary Examiner*—Eric Coleman
*Assistant Examiner*—Mackly Monestime
*Attorney, Agent, or Firm*—Scully, Scott, Murphy & Presser; Stephen C. Kaufman, Esq.

[57] ABSTRACT

A parallel processing system having a number of processing nodes (S1 . . . Sn) each of which is provided with a message handling kernel (13 . . . n3) and an associated procedure register (14 . . . n4), the procedure registers being loadable by loading means (4) under the control of an application (3) and the nodes being able to exchange messages over a message interface (2) and to process messages to determine the message handling procedures to be invoked by the associated node in accordance with the contents of the associated procedure register.

10 Claims, 2 Drawing Sheets

| LAST_NAME | M/F | AGE | HISTORY | — | — |
|---|---|---|---|---|---|
| B —— | M | 42 | A | | |
| M —— | F | 17 | B | | |
| O —— | M | 45 | C | | |
| J —— | M | 27 | D | | |
| P —— | F | 42 | E | | |
| Y —— | M | 53 | F | | |

PARALLEL DATA PROCESSING SYSTEM AND METHOD OF CONTROLLING SUCH A SYSTEM

FIELD OF THE INVENTION

This invention relates generally to data processing systems and more particularly to systems wherein a number of processing units are organised to process data simultaneously. Such systems, referred to as parallel processing systems, are typically used to process large quantities of data more rapidly than would be the case using a single processor, usually with the additional advantage of enhanced reliability.

BACKGROUND OF THE INVENTION

While these advantages can readily be achieved where sets of data to be processed by the processing units or nodes are independent, a problem arises when the result of processing in one or more nodes affects the processing operations taking place in another node or nodes.

If, for example, code is written to perform in parallel what has hitherto been an essentially serial operation, the dependencies between the various parallel operations may become extremely complex, to the point where the analysis of potential conflict can be prohibitively difficult. The code may require a great deal of testing and corrective procedures in order to deal with the synchronising messages which are necessarily exchanged between parallel strands of an application program.

Such a situation can arise in the analysis of the substantial quantities of data, extending to many millions of records, obtained in commercial activities such as insurance and retailing. Speedy analysis is essential if marketing strategy is to be effectively and flexibly matched to customer needs and preferences, and a number of processes have been developed to recognise marketing trends in order to respond effectively thereto.

In one such process, referred to as data mining, records are analysed serially to develop a model which can be used for predicting trends. The model is dynamically updated as the analysis proceeds, and each processing step is required to be taken in accordance with the model that is current. Data mining has accordingly been traditionally performed as a serial, single processor operation. This is necessarily a computationally intensive process, and considerable advantage could be gained by the application of parallel processing techniques to processes such as data mining.

SUMMARY OF THE INVENTION

In accordance with the invention there is provided a parallel processing system comprising a plurality of processing nodes each adapted to process data under the control of an application programme, in which each node has associated therewith a message handling kernel function and a procedure register, said system including a message interface interconnecting the message handling kernels associated with said nodes and means for loading message handling procedures selectively into the procedure registers of the various nodes, each message handling kernel being adapted to respond to messages applied to said message interface during execution of said application programme to control its associated node in accordance with message handling procedures selected from the associated procedure register.

There is further provided a method of controlling a parallel processing system having a plurality of processing nodes comprising the steps of providing, for each node, a message handling kernel and a procedure register, loading selectively into the procedure registers of each node message handling procedures to be invoked by the message handling kernel associated with that node and controlling the node in accordance with message handling procedures selected from the associated procedure register under the control of messages received from another node or nodes in the system.

In a preferred embodiment of the invention the system is configured to define a master-slave relationship, one of the nodes being designated as a master node in which the application programme and control thereof resides while the others operate as slave nodes responding to messages originating from the master.

The procedure registers associated with each slave node are loaded initially under the control of the master node and may be updated from time to time as the application proceeds.

In another aspect of the invention, there is provided a computer program product comprising computer readable program code recorded on a computer readable recording medium, for use in controlling execution of application programs on a parallel processing system having a plurality of processing nodes, said computer readable program code comprising:

means for providing, for each of said nodes, a message handling kernel and a procedure register;

means for loading selectively into the procedure registers of each node message handling procedures to be invoked by the message handling kernel provided for that node;

wherein each message handling kernel is adapted to control its associated node in accordance with message handling procedures selected from the associated procedure register.

A significant advantage of the message handling kernel is its ability correctly to process any message type as and when it arrives without requiring undesirable complexity within the application itself. Since the structure of an application program for a parallel system can be greatly simplified if a message handling solution according to the invention is used, application programs for parallel systems which are developed for use with the present invention are likely to be inherently more reliable and more easily maintainable than would be possible without the present invention.

DETAILED DESCRIPTION OF THE PREFERRED EMBODIMENT

Figures 1, 2:
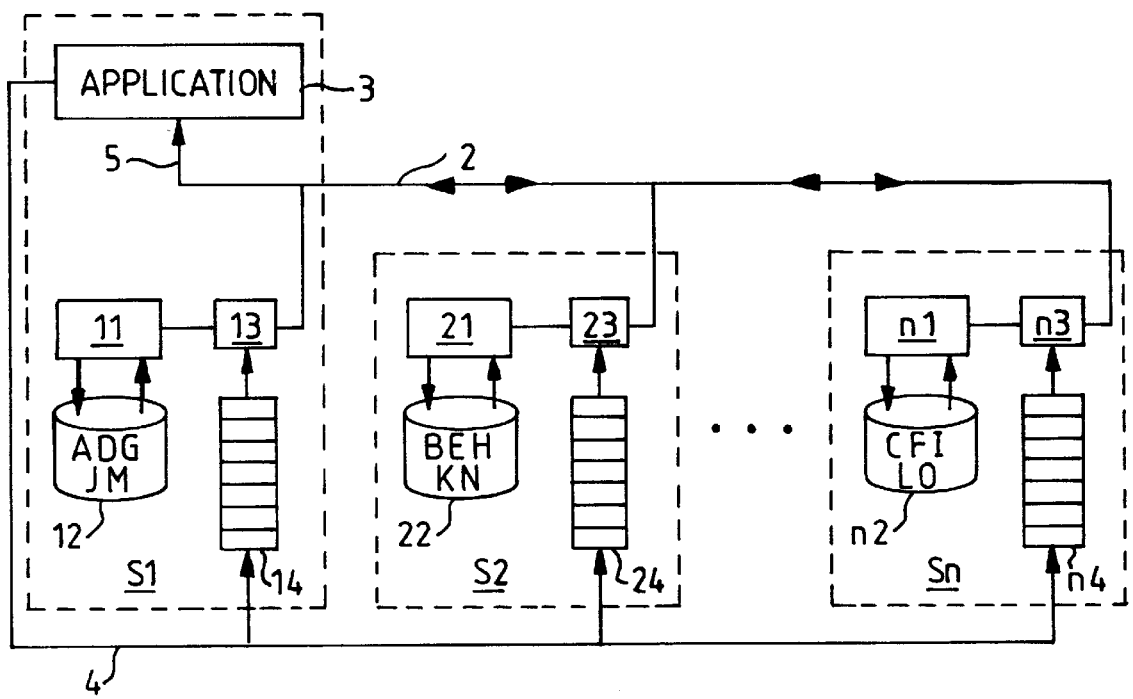
FIG. 1 shows a parallel processing system embodying the invention.
FIGS. 2 is a table showing in simplified form a group of records which may be processed using the system of FIG. 1.

Referring first to FIG. 1 a parallel processing system embodying the invention comprises a number of processing nodes S1,S2 . . . Sn each having an associated processor 11, 21 . . . n1 for operating on records stored in a storage unit 12, 22, . . . n2. A software implemented message handling kernel function 13, 23 . . . n3 is defined within each of the processing nodes and has associated with it a procedure register 14,24 . . . n4. A bidirectional message interface, 2, interconnects the message handling kernels in all nodes and an application controller, 3 is arranged to provide procedures over an interface, 4, for initialising the various procedure registers 14, . . . n4 and if necessary updating these registers as the application proceeds. In the preferred embodiment, the procedure registers in the various nodes are loaded on a selective basis with message handling procedures appropriate to the particular application.

In the preferred embodiment node 1 is designated as a master node while the remaining nodes are designated slaves. Thus the application programme and its control reside in the master node 1, and the slaves respond to messages from the master node. While the system may be implemented using various computer platforms the preferred embodiment employs a parallel array of IBM RISC System/6000 processors. (RISC System/6000 is a trademark of IBM Corporation).

A simplified group of records of the type to which the system is applicable is shown in FIG. 2. which represents a large database of records developed by an insurance company from customer data. The purpose of a data mining operation using such data may be for example to identify groups of people whose records have certain characteristics within a range of similarity so as to develop categories to which common terms and conditions of insurance can be offered. This process is referred to as segmentation.

In operation, the system is loaded with the records in such a way as to effect a reasonably even distribution of records between the various nodes. As shown by the letters associated with the storage units 12 . . . n2 in FIG. 1, this may be done by allocating records in stripes or subsets, or other approaches may be followed depending on the needs of the application. Running the application then involves first the development of statistics by all nodes with subsequent aggregation by the master node, followed by the construction of an initial model from a sample of records, using those statistics.

The master node starts the development of the initial model by issuing a trigger message, following which all nodes send their contribution of records from their associated storage units. On completion of the development of the initial model, the master node distributes it to the slaves.

There then follows a series of passes using all nodes. Each pass is a complete scan through the data and within a given pass, there are a number of phases. During a phase the models on individual nodes would diverge if permitted to do so, so the changes are accumulated and the master node consolidates them at the end of each phase and distributes the latest model state to all the slaves. The initiation of passes and phases is controlled by trigger messages sent by the master node. At the end of a given pass the master node may determine that the application should be terminated, for example if it detects that the model is sufficiently stable to meet the requirements of the application, and issues a termination message.

As the application proceeds, trigger messages are used to re-synchronise the nodes. In this connection it will be appreciated that a typical parallel processing system may well be running a number of applications and that at any one time a node may be performing other tasks in other partitions which may make it unavailable to process a request immediately. Information reflecting the status and availability of the node can be determined by the master via the message interface 2. In another embodiment, a message indicating the status and availability of the node is returned to the master via the message interface.

When the master node receives an indication that a slave node is available it sends a message requesting further processing. The type of processing required is defined by message handling procedures loaded into the procedure register associated with the node in question and the message includes an identifier ID which enables the message handling kernel to select the appropriate procedure.

Typically two or three passes are required to achieve the required degree of stability. The master node then issues a termination message. Any slave node recognising such a termination message must respond by performing the appropriate termination procedure at whatever point it has reached in the processing of data.

It should be noted that a significant advantage of the message handling kernel is its ability correctly to process any message type as and when it arrives without requiring undesirable complexity within the application itself.

The system of FIG. 1 provides:
1. A message handling kernel which is independent of the parallel processing application;
2. A method of providing the kernel with a list of the message types that the application requires, but with no knowledge of the content of each type;
3. A message structure which enables the kernel to determine which message handling procedure to invoke, without being aware of the content; and
4. A registration mechanism (the procedure register) for the application to provide message handling procedures for the message types it has told the kernel it requires.

Figure 3:
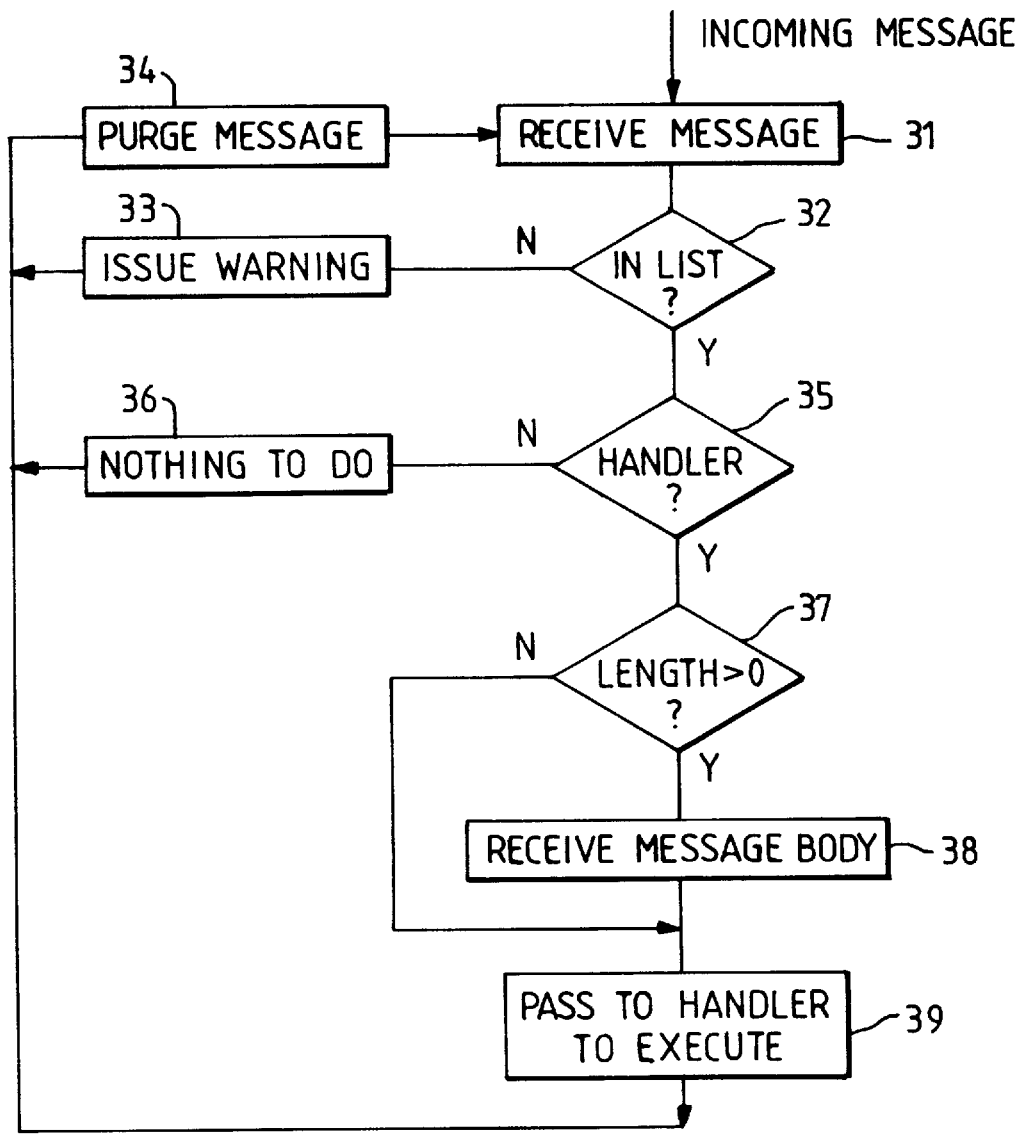
FIG. 3 is a flow chart showing the steps performed by the message handling kernel.
Figure 4:
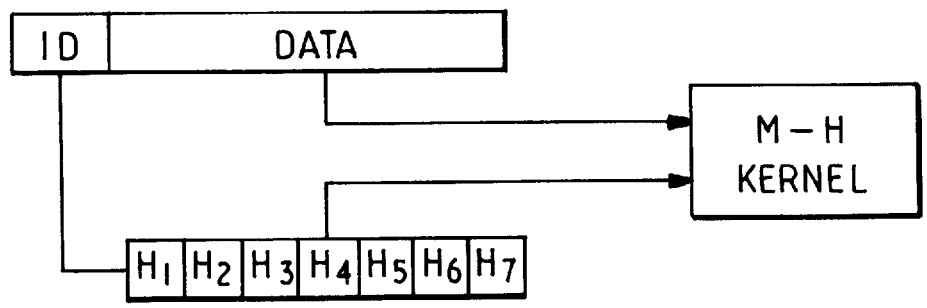
FIG. 4 shows the structure of a typical message and the manner in which it is interpreted at a processing node.

This is illustrated in FIG. 3, which shows the sequence of events for processing messages, and FIG. 4, which depicts a typical message structure. Before any messages are sent the application controller provides to the various procedure registers message handling procedures for each of the message types it intends the associated node to handle.

A typical message is intended to trigger a specific action, such as a message sent from the master to each of the slaves when requesting data. Referring to FIG. 4., the message structure includes an indicator portion 41 and a body portion 42. The indicator portion contains a value for the length of the information in the body portion, a message length of zero indicating that the message is a trigger with no body portion. The message is inspected by the kernel to select the message handling procedure appropriate for the ID included in the message.

A second typical message is a slave's response to such a trigger, asking for data. Having assembled the data for the reply, the slave sends a message to the master which includes a body portion. The kernel associated with the master, on receiving this reply, goes on to read the body portion and passes it on to the message handling procedure which is registered to deal with the message ID contained in the indicator portion.

The function performed by the various message handling kernels and their associated procedure registers can thus be likened to that of a funnel through which all messages on the interface 2 are passed. This is illustrated in flow chart form in FIG. 3.

Referring to FIG. 3. an incoming message on message interface 2 is received at step 31 and a test is made at step 32 to determine whether the message type is in the list of types required by the current application. If it is not, a warning is issued at 33 and the message is purged at 34. At step 35 a further test is made to determine whether a message handling procedure for the particular message received is registered in the associated procedure register 14, 24, . . . n4. If no message handling procedure is registered a flag is raised at 36 indicating that the message cannot be handled and the message is also purged at step 34. If the appropriate message handling procedure is found a test is made to determine whether the message is a trigger message as discussed above with a message length of zero or whether data is also carried by the message. In the latter case the message body is received at 38 for use in further processing at the node. If the message is a trigger message this step is bypassed and in both cases the message handling procedure is executed at step 39 after which the message is purged at 34 and the message handling kernel returns to the waiting mode for the reception of further messages.

In the preferred system the message handling procedures are implemented as user objects responding to triggers and data messages transmitted by message objects generated in the nodes.

In the present embodiment, a single message handling procedure is registered in the procedure register for each message type permitting the application logic sequence to be set out entirely within the message handling procedure. This permits easy maintainability since the logic resides in one place only. However a sequence of message handling procedures can be registered for each message type representing the steps that an application will pass through in response to that message type. This makes the application code more concise since the complexity of sequencing is built into the message handling kernel, providing a generic re-usable message handling process.

While there has been described a parallel processing system organised on a master-slave basis with the application and application controller provided within the master node, it will be appreciated that the techniques described are equally applicable to an arrangement where there is no one node in control. In such an organisation, referred to as a "peer-to-peer" organisation, all nodes communicate with each other, each responding to messages according to their current state and to message handling procedures registered in the various procedure registers. The techniques described are similarly applicable to an arrangement in which one of the nodes is solely dedicated to the control and running of the application.

Furthermore, although the embodiment of FIG. 1 has been described in the context of the process of data mining and segmentation, it will be appreciated by those skilled in the art that the techniques described are applicable generally in the field of parallel data processing.

Claimed is:

1. A parallel data processing system comprising a plurality of processing nodes each adapted to process data under the control of an application program, in which each node has associated therewith a message handling kernel and a procedure register, said system including a message interface interconnecting the message handling kernels associated with said nodes and means for loading message handling procedures selectively into the procedure registers of the various nodes, each message handling kernel being adapted to respond to synchronization messages applied to said message interface during execution of said application program to select a message handling procedure from the associated procedure register and to control its associated node in accordance with the selected message handling procedure.

2. A system as claimed in claim 1 in which each message handling kernel is further adapted to deliver to said message interface messages reporting the progress of message handling procedures selected from said associated procedure register.

3. A system as claimed in claim 1 in which each message includes a type identifier and has one or more message handling procedures associated therewith according to its type.

4. A system as claimed in claim 1, configured to define a master-slave relationship, one of the nodes being designated as a master node in which the application programme and control thereof resides while the remaining nodes operate as slave nodes responding to messages originating from the master node.

5. A system as claimed in claim 4 in which the procedure registers associated with each slave node are loaded initially from an application residing within the master node and are updated as the application proceeds.

6. A method of controlling a parallel processing system having a plurality of processing nodes comprising the steps of providing, for each node, a message handling kernel and a procedure register, loading selectively into the procedure registers of each node message handling procedures to be invoked by the message handling kernel associated with that node and controlling the node in accordance with message handling procedures selected from the associated procedure register in response to synchronization messages received from another node or nodes in the system.

7. A method as claimed in claim 6 including the further steps of identifying each message by means of a type identifier, and providing in each procedure register one or more message handling procedures for each message so identified.

8. A method as claimed in claim 6 including the further step of designating one of said processing nodes as a master node and the remaining nodes as slave nodes.

9. A method as claimed in claim 8 including the further steps of loading the procedure registers associated with each slave node initially from an application residing within the master node, and subsequently updating the procedure registers associated with the slave nodes as the application program proceeds.

10. A computer program product comprising computer readable program code recorded on a computer readable recording medium, for use in controlling execution of application programs on a parallel processing system having a plurality of processing nodes, the computer readable program code comprising:

means for providing, for each of said nodes, a message handling kernel and a procedure register;

means for loading selectively into the procedure registers of each node message handling procedures to be invoked by the message handling kernel provided for that node;

wherein each message handling kernel is adapted to control its associated node in accordance with message handling procedures selected from the associated procedure register in response to synchronization messages received from another node or nodes in the system.

* * * * *